(12) United States Patent
Yamamoto

(10) Patent No.: US 10,220,382 B2
(45) Date of Patent: Mar. 5, 2019

(54) BARRIER ISOLATOR

(71) Applicant: SHIBUYA CORPORATION, Ishikawa (JP)

(72) Inventor: Kanjun Yamamoto, Ishikawa (JP)

(73) Assignee: SHIBUYA CORPORATION, Ishikawa (JP)

( * ) Notice: Subject to any disclaimer, the term of this patent is extended or adjusted under 35 U.S.C. 154(b) by 0 days.

(21) Appl. No.: 15/635,511

(22) Filed: Jun. 28, 2017

(65) Prior Publication Data

US 2018/0001316 A1    Jan. 4, 2018

(30) Foreign Application Priority Data

Jun. 30, 2016    (JP) .................................. 2016-130852

(51) Int. Cl.
| | | |
|---|---|---|
| *B01L 1/00* | (2006.01) | |
| *B01L 1/02* | (2006.01) | |
| *B25J 21/02* | (2006.01) | |
| *E05D 15/30* | (2006.01) | |

(Continued)

(52) U.S. Cl.
CPC ................. *B01L 1/02* (2013.01); *B25J 21/02* (2013.01); *E05D 15/30* (2013.01); *E05D 15/58* (2013.01); *B01L 1/00* (2013.01); *B01L 2200/0689* (2013.01); *B01L 2200/082* (2013.01); *B01L 2200/087* (2013.01); *B01L 2200/141* (2013.01); *B01L 2200/145* (2013.01);

(Continued)

(58) Field of Classification Search
CPC ......... A47B 61/00; A47B 63/00; E05D 15/00; E05D 15/30; E05D 15/406; E05Y 2900/212; B01L 1/02; B01L 2300/046; B25J 21/02

USPC ........... 312/322, 323, 109, 1, 326–329, 325, 312/139.1, 138.1, 110, 292, 291; 49/197, 49/201–204, 152, 153, 176, 260
See application file for complete search history.

(56) References Cited

U.S. PATENT DOCUMENTS

| | | | |
|---|---|---|---|
| 443,350 A | * | 12/1890 | Berners |
| 712,926 A | * | 11/1902 | Grigg |
| 726,362 A | * | 4/1903 | Shrivell |

(Continued)

FOREIGN PATENT DOCUMENTS

| | | |
|---|---|---|
| DE | 9203008 | 9/1992 |
| DE | 202014005774 | 8/2014 |

(Continued)

OTHER PUBLICATIONS

Search Report issued in EPO Patent Application No. 17178985.2, dated Nov. 20, 2017.

*Primary Examiner* — Janet M Wilkens
(74) *Attorney, Agent, or Firm* — Greenblum & Bernstein, P.L.C.

(57) ABSTRACT

An isolator comprises a manipulation chamber isolated from the external atmosphere, a door for opening and closing a portal formed on the manipulation chamber, a linear guide mechanism for guiding a linear motion of a front-side edge of the door along the portal, and a rotation guide mechanism defining a rotation of the door about an axis coinciding with the front-side edge. The door is closed by positioning the front-side edge at the front side of the manipulation chamber, and the door is opened inward into the manipulation chamber by moving the front-side edge toward the back side while rotating the door about the front-side edge.

5 Claims, 4 Drawing Sheets

(51) Int. Cl.
    *E05D 15/58*     (2006.01)
    *E05D 15/36*     (2006.01)

(52) U.S. Cl.
    CPC ... *B01L 2300/043* (2013.01); *B01L 2300/046* (2013.01); *E05D 15/36* (2013.01); *E05Y 2800/12* (2013.01)

(56) References Cited

U.S. PATENT DOCUMENTS

| | | | | |
|---|---|---|---|---|
| 1,855,953 | A * | 4/1932 | Friedrich | A47F 3/043 16/104 |
| 1,970,351 | A * | 8/1934 | Wiersma | E05D 15/30 49/260 |
| 2,581,783 | A * | 1/1952 | Bates | E05D 15/30 292/92 |
| 2,718,675 | A * | 9/1955 | Olsen | E05D 15/30 49/252 |
| 3,410,619 | A * | 11/1968 | Delnay | B25J 21/02 312/1 |
| 3,439,453 | A * | 4/1969 | Avril | E05D 15/445 49/204 |
| 3,992,816 | A * | 11/1976 | Skahill | E05D 15/38 312/323 |
| 4,111,753 | A * | 9/1978 | Folsom | B01L 1/00 312/1 |
| 5,219,215 | A * | 6/1993 | Akagawa | B01L 9/02 312/1 |
| 5,257,957 | A * | 11/1993 | Diccianni | B25J 21/02 312/1 |
| 5,316,733 | A * | 5/1994 | Rune | B25J 21/02 312/1 |
| 5,369,912 | A | 12/1994 | Ginzel et al. | |
| 5,567,025 | A * | 10/1996 | Haag, III | B01L 1/02 220/377 |
| 5,581,942 | A * | 12/1996 | Sill | E04D 13/0357 49/153 |
| 6,465,244 | B1 | 10/2002 | Annable et al. | |
| 6,553,722 | B1 * | 4/2003 | Porret | B01L 1/02 49/507 |
| 6,849,233 | B2 * | 1/2005 | Bushnell et al. | A61L 2/084 250/453.11 |
| 6,974,197 | B1 * | 12/2005 | Henry | B01L 1/50 312/1 |
| 8,215,728 | B2 * | 7/2012 | Mehman | |
| 9,498,396 | B2 * | 11/2016 | Bradford | E05F 1/04 |
| 2005/0168117 | A1 * | 8/2005 | Porret | B01L 1/02 312/291 |
| 2016/0339130 | A1 | 11/2016 | Shomura et al. | |

FOREIGN PATENT DOCUMENTS

| | | |
|---|---|---|
| FR | 2838656 | 10/2003 |
| GB | 2213185 | 9/1989 |
| GB | 2228283 | 8/1990 |
| JP | 2015-139492 | 8/2015 |
| WO | 98/48980 | 11/1998 |
| WO | 00/02659 | 1/2000 |
| WO | 2012141654 * | 4/2011 |

* cited by examiner

B-B  A-A

BARRIER ISOLATOR

BACKGROUND OF THE INVENTION

1. Field of the Invention

The present invention relates to a barrier isolator having a portal for communicating with a pass box, an incubator, etc., connected to the isolator, and a door for opening-closing the portal.

2. Description of the Related Art

An aseptic manipulation system is known for cultivating human cells and tissues, for example, inside an aseptic manipulation chamber, which is isolated from the external atmosphere and maintained in an aseptic condition. Such a system includes an isolator that can be connected to a pass box and an incubator. When the pass box and/or the incubator are connected, the aseptic manipulation chamber, which configures the interior space of the isolator, can communicate with the interior spaces of the pass box and the incubator through the portal provided in a wall so that items such as cells and implements can be inserted or removed via this portal. The aseptic manipulation chamber is provided with a door, which is normally closed, that can hermetically seal the opening to isolate the aseptic manipulation chamber from the pass box and the incubator. See Japanese Unexamined Patent Publication No. 2015-139492.

SUMMARY OF THE INVENTION

The aseptic manipulation chamber of the isolator is provided with gloves on the front side, into which an operator's hands can be inserted to manipulate objects inside the chamber. Further, the pass box and the incubator are connected to the sides of the isolator, respectively. In order to communicate with the pass box or incubator, an opening or portal is formed on one side of the aseptic manipulation chamber. The opening is provided with a door that opens inward into the aseptic manipulation chamber. For the ease of an operator transferring items through the portal, the door is hinged along the far side of the portal from the operator's position, which allows the door to pivot away from the portal and move toward the back-wall side from the operator's position when opening. This operation poses no problem when the degree of the door opening is small, however, when the degree of the door opening is large, the operator must release his grip on a door handle and push the door directly. Further, when the door is wide open the door handle faces the back wall of the aseptic manipulation chamber so that the operator must extend a hand to the opposite side of the door to grab the door handle, thus diminishing operability. Moreover, an area where the door passes through when it is operated should be kept unoccupied where no object can be placed.

One aspect of the present invention is to provide a barrier isolator with improved door operability and space efficiency.

According to a primary aspect of the present invention, an isolator is provided that comprises a manipulation chamber isolated from the external atmosphere, a door for opening and closing a portal formed on the manipulation chamber, a linear guide mechanism for guiding a linear motion of a front-side edge of the door along the portal and a rotation guide mechanism defining a rotation of the door about an axis coinciding with the front-side edge. The door is closed by positioning the front-side edge at the front side of the manipulation chamber, and the door is opened inward into the manipulation chamber by moving the front-side edge toward the backside while rotating the door about the front-side edge.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
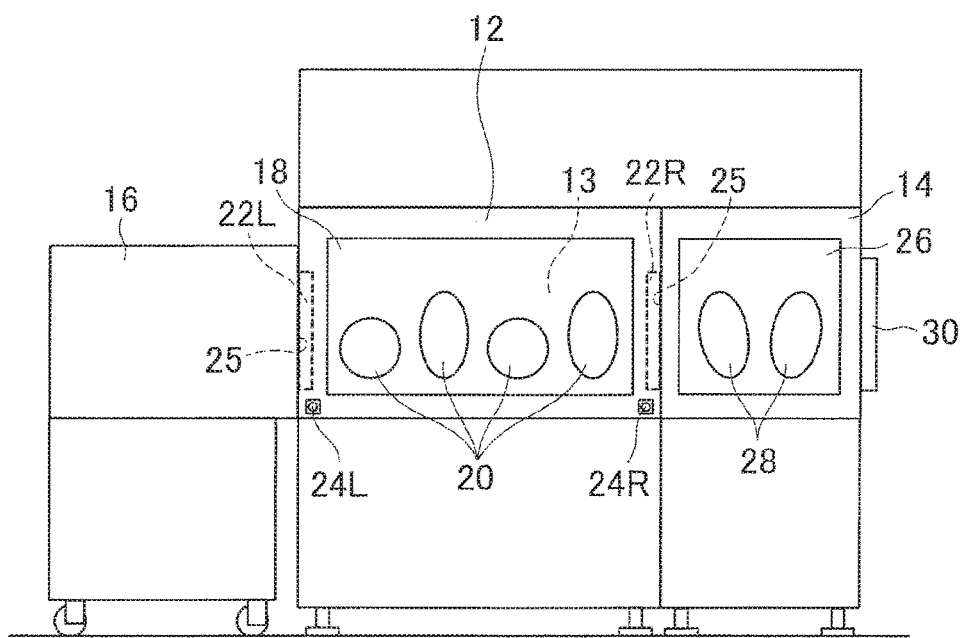
FIG. 1 is a front view of an isolator system of an embodiment of the present invention.

The present invention is described below with references to the embodiments shown in the drawings. FIG. 1 is a front view illustrating a general configuration of an isolator system of an embodiment of the present invention.

The isolator system 10 includes an isolator 12, a pass box 14 connected to one side of the isolator 12, and an incubator 16 connected to the other side of the isolator 12. In the example of FIG. 1, the pass box 14 is connected to the right side of the isolator 12 and the incubator is connected to the left side of the isolator 12.

The isolator 12 has an internal aseptic manipulation chamber 13 with an observation window 18 on the front side of the aseptic manipulation chamber. A plurality of gloves 20, into which an operator's hands are inserted for manipulating items inside the aseptic manipulation chamber 13, is provided on the window 18. On the right side of the aseptic manipulation chamber 13 a door 22R is provided for opening-closing a portal 25 connecting the aseptic manipulation chamber 13 to the pass box 14. On the left side of the aseptic manipulation chamber 13 a door 22L is provided for opening-closing a portal 25 connecting the aseptic manipulation chamber 13 to the incubator 16. Further, on the right and left sides of the front face of the isolator 12, seal-activating switches 24R and 24L are provided for sealing clearance gaps between the portal 25 and respective doors 22R and 22L by expanding a looped tube (seal member) 34, which will be explained later. Note that since the positive pressure inside of the aseptic manipulation chamber 13 is regulated by adjusting an air supply/emission rate, an aseptic condition of the aseptic manipulation chamber 13 can be maintained by decontaminating the interior space beforehand.

As well as the isolator 12, the pass box 14 is also provided with a window 26 on its front face and a pair of gloves 28, for example, is provided on the window 26 for manipulating objects inside the pass box 14. Further, on the side wall of the pass box 14 that faces the door 22R, a door 30 for transferring objects is provided. When transferring objects inside the aseptic manipulation chamber 13, which is maintained in an aseptic condition, the objects are temporarily housed inside the pass box 14 and decontaminated or sterilized before communication is allowed between the aseptic manipulation chamber 13 and the pass box 14 in order to transfer the object(s) inside the aseptic manipulation chamber 13. Further, the incubator 16 is detachable from the isolator 12, but the incubator 16 is in communication with the aseptic manipulation chamber 13 when it is attached to the isolator 12 so that cells can be placed inside the aseptic manipulation chamber 13 to cultivate for a predetermined period.

Figure 2:
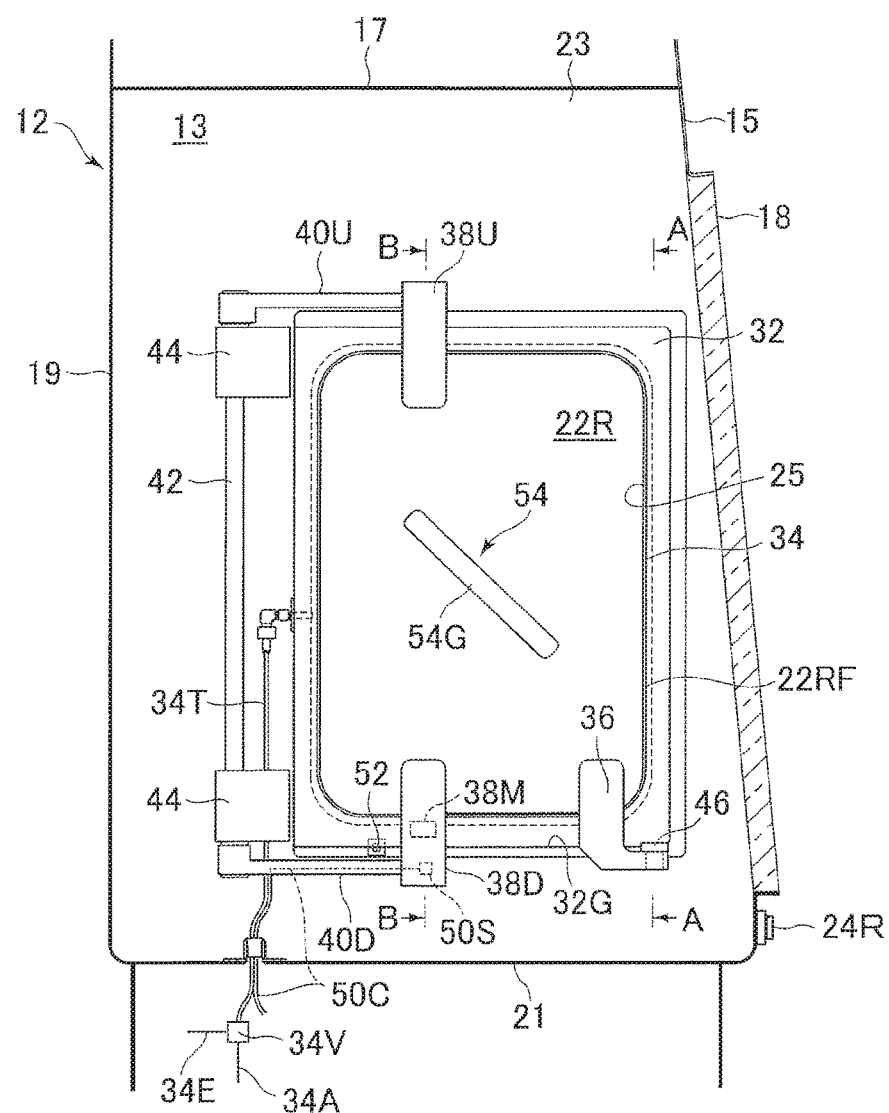
FIG. 2 is a side view of a door of the isolator when the door is placed in the closed state.
Figure 3A:
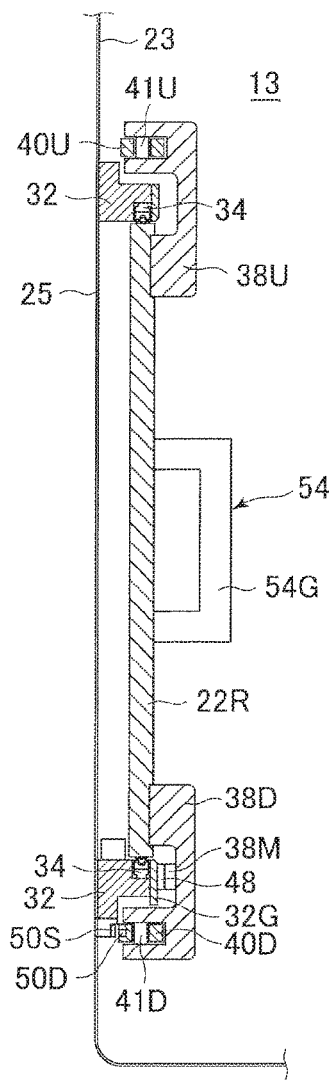
FIG. 3A is a sectional view of the isolator along line B-B of FIG. 2.
Figure 3B:
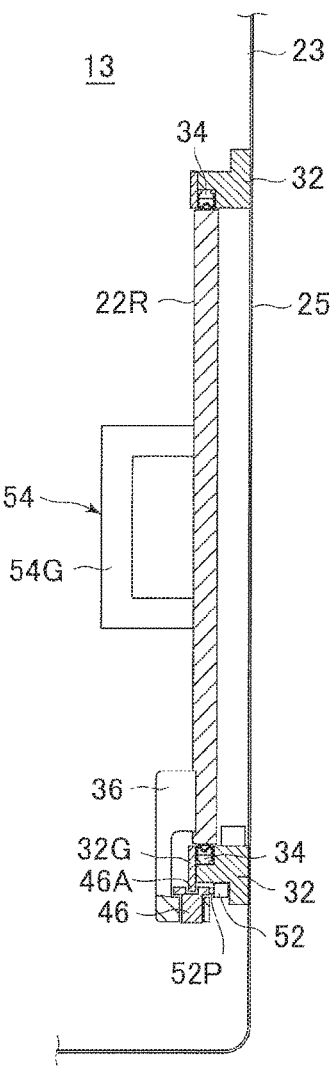
FIG. 3B is a sectional view of the isolator along line A-A of FIG. 2.

With reference to FIGS. 2 and 3, the structure of the doors 22R and 22L of the present embodiment will be explained. FIG. 2 is a front view of the closed door 22R viewed from a position inside the aseptic manipulation chamber 13 of the isolator 12. FIG. 3A is a cross-sectional view along line B-B of FIG. 2, and FIG. 3B is a cross-sectional view along the line A-A of FIG. 2. Incidentally, the structure of the door 22L is the same as that of the door 22R except for reversing the right and left; therefore, the explanation for the door 22L is omitted.

The aseptic manipulation chamber 13 of the isolator 12 is surrounded by inner faces of a front wall 15, a ceiling 17, a floor 21, and right and left side walls 23. The window 18 is provided on the front wall 15. A portal 25 is formed on the side wall 23 at an area corresponding to the door 22R. A frame member 32 is provided on the periphery surrounding the portal 25. When the door 22R is closed as illustrated in FIGS. 2 and 3, the door 22R is positioned inside the frame member 32 and the door 22R is fitted into the opening of the portal 25. The expandable looped tube 34 is installed on the inner circumferential surface of the frame member 32, to which the outer circumferential surface of the door 22R faces.

The looped tube 34 can be expanded by injecting air therein through a tube 34T. When the door 22R is closed, the looped tube 34 is expanded and pressed against the outer circumferential surface of the door 22R to hermetically close the clearance between the frame member 32 and seal the portal 25. On the other hand, when opening the door 22R, air is released from the looped tube 34 until it reaches its original diameter to release the door 22R secured to the frame member 32 by the expanded looped tube 34. Note that the tube 34T is connected to an intake path 34A and an exhaust path 34E via an electromagnetic valve 34V so that a path communicated with the tube 34T is alternatively switched between the intake path 34A and the exhaust path 34E via the electromagnetic valve 34V. Namely, the intake path 34A can be in communication with the tube 34T by the electromagnetic valve 34V to expand the looped tube 34 and the exhaust path 34E can be in communication with the tube 34T by the electromagnetic valve 34 to deflate the looped tube 34. Note that the switching operation for the electromagnetic valve 34V of the door 22R is achieved by an operator manipulating a seal-actuating switch 24R. Incidentally, the looped tube 34 can also be provided on the outer circumferential surface of the door 22R.

A front support member 36 including a guide arm is provided on a lower portion of the door 22R, close to the front wall 15 (front side) and on the surface exposed to the aseptic manipulation chamber 13. The front support member 36 is provided with a driven member 46 that slidingly engages with a guide rail 32G provided along the lower-side edge of the frame member 32, such that the driven member 46 is guided along a guide rail 32G. The guide rail 32G is formed as a narrow plate and the driven member 46 is formed to have a slit-like groove 46A into which an edge of the driven member 46 is inserted. The driven member 46 is rotatably pivoted about a vertical axis with respect to the front support member 36. Namely, the driven member 46 restricts the movement of the front-side edge 22RF to a back-and-forth movement in parallel with the portal 25 while allowing a rotation about the axis corresponding to the front-side edge 22RF of the closed door 22R. Accordingly, a linear guide mechanism for defining the linear movement of the door 22R is configured by the guide rail 32G, which guides the reciprocal movement of the front-side edge 22RF of the door 22R in the back-and-forth direction.

On the other hand, the rear side of the door 22R, which is close to the back wall 19 of the aseptic manipulation chamber 13, is supported by an upper support member 38U and a lower support member 38D. The upper support member 38U and the lower support member 38D are attached to the door 22R at the same position in the horizontal back-and-forth direction of FIG. 2. The tip of an upper rotation lever 40U is rotatably supported by the upper support member 38U via a connecting shaft 41U, and the tip of a lower rotation lever 40D, which has the same length as the upper rotation lever 40U, is rotatably supported by the lower support member 38D via a connecting shaft 41D. Further, the base ends of the upper rotation lever 40U and the lower rotation lever 40D are connected by a rotational shaft 42. The rotational shaft 42 is rotationally supported by a pair of journal members 44 provided on an upper position and a lower position of the side wall 23, in the rear of the frame member 32 between the back wall 19 and the frame member 32. Namely, the upper rotation lever 40U, the rotational shaft 42, and the lower rotation lever 40D are integrally rotated about the journal members 44. Further, the rotation of the door 22R about an axis that coincides with the front-side edge 22RF is guided by the rotation of the upper rotation lever 40U and the lower rotation lever 40D. As described, a rotation guide mechanism that defines the rotation of the door 25 is configured.

A magnet 38M is provided on the side of the lower support member 38D that faces the side wall 23. A magnetic substance 48 is provided at the position where the magnet 38M abuts when the door 25 is closed. In the example of FIG. 3, the magnetic substance 48 is provided on the guide rail 32G (or on the frame member 32). When the door 22R is closed, the magnet 38M is attracted to the magnetic substance 48 and fixed thereto. Namely, the magnet 38M and the magnetic substance 48 retain the position of the door 22R when the seal is released by deflation of the looped tube 38 and the door 22R is not fixed to the frame member 32. In other words, the magnetic force configures a locking mechanism that prevents the door 22R from opening.

Further, a dog 50D is provided on the side of the lower rotation lever 40D facing the side wall 23, and a proximity switch 50S is provided on the frame member 32 at a position where the dog 50D will be located adjacent to the proximity switch 50S when the door 22R is closed. The proximity switch 50S is connected to a controller, which is not shown, via cables 50C. When the seal-activating switch 24R is turned on while the dog 50D is detected by the proximity switch 50S, the controller switches the electromagnetic valve 34V to allow communication between the intake path 34A and the tube 34T so that air is pumped into the looped tube 34. As the looped tube 34 expands as air is pumped in, the clearance between the door 22R and the frame member 32 is filled and in turn sealed. On the other hand, when the seal-activating switch 24R is turned off while the dog 50D is detected by the proximity switch 50S, the controller switches the electromagnetic valve 34V to allow communication between the exhaust path 34E and the tube 34T so that air is evacuated from the looped tube 34. As the looped tube 34 deflates as the air evacuates, the seal between the door 22R and the frame member 32 is released.

Further, a stopper 52 (a locking mechanism) for keeping the door 22R open is provided on the frame member 32 on the side closest to the back wall 19 of the aseptic manipulation chamber 13. The stopper 52 includes an engaging member 52P that is biased by a spring (not shown). The engaging member 52P is arranged to protrude toward the guide rail 32G. As described later, the door 22R is opened by sliding the front-side edge 22RF and the driven member 46 along the guide rail 32G toward the back side of the aseptic manipulation chamber 13, and just before the door is completely opened the driven member 46 makes contact with the engaging member 52P of the stopper 52.

When the driven member 46 is pressed upon the engaging member 52P, the engaging member 52P is pressed into the stopper 52 resisting against the biasing force. The driven member 46 runs over the stopper 52 and is stopped at the back end of the guide rail 32G. At this moment, the engaging member 52P once again projects outwardly via the biasing force so that the door 22R is maintained in the open position. The projecting engaging member 52P prevents the driven member 46 from being unintentionally returned to the front side (the side closest to the front wall 15) along the guide rail 32G, and thus the door is maintained open. Incidentally, in the reverse operation of the door 22R from the opened state to the closed state, the driven member 46 runs over the stopper 52 in a reversed manner from that mentioned above.

Further, at about the center of the door 22R, on the surface facing the aseptic manipulation chamber 13, a handle (an operating element) 54 for operating the door 22R is provided. The handle 54 has a rod-like grip portion 54G extending along the face of the door 22R. The grip portion 54G is inclined so that as the front side (the side closest to the front wall 15) of the aseptic manipulation chamber 13 is lowered, it is inclined to descend to about 45 degrees from the back side (the side closest to the back wall 19) to the front side (the side closest to the front wall 15). Incidentally, the handle 54 is positioned within the operational range of the gloves 20 (see FIG. 1) at about the same level as the gloves 20 or slightly lower; therefore, the position of the handle is easily operable by an operator inserting one's hands into the gloves 20.

Figure 4:
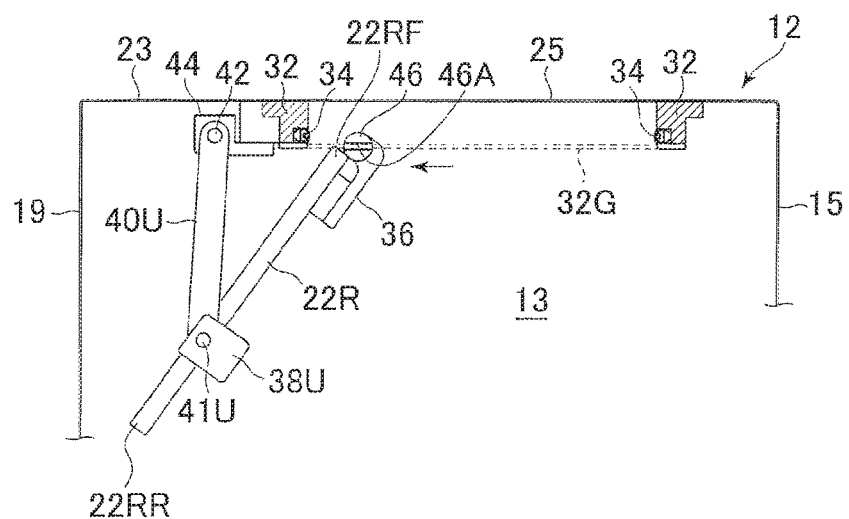
FIG. 4 is a partial plan view of the isolator showing the structure of an open/close mechanism for the door.
Figure 5:
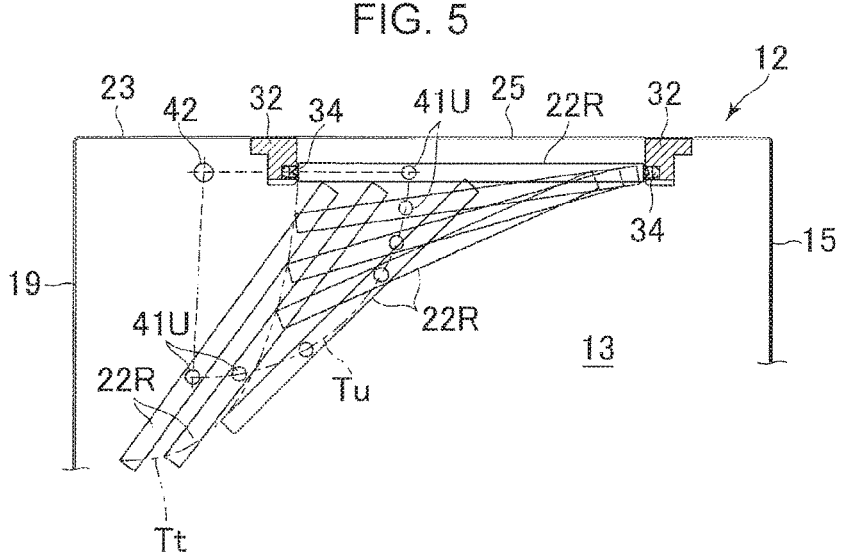
FIG. 5 is a partial plan view of the isolator showing the behavior of the door when it is opened or closed.

With reference to FIGS. 4 and 5, the opening and closing operation of the door 22R of the present embodiment will be explained. Both of FIGS. 4 and 5 illustrate the structure of the door 22R viewed from the top side. FIG. 4 illustrates the mechanical structure of the opening/closing mechanism and the door 22R is shown as the open state. FIG. 5 illustrates the opening/closing behavior of the door 22R and a plurality of different positions of the door 22R, which may take place in the operation from the closed state to the open state or in the reversed operation.

An operator first grabs the grip 54G of the handle 54 via the glove 20 (see FIG. 1) after releasing the seal of the portal 25 by operating the seal-activating switch 24R and deflating the looped tube 34, then rotates the door 22R about the front-side edge 22RF toward the inside of the aseptic manipulation chamber 13 while pushing the handle 54 toward the back wall 19 from the front wall 15 side, thereby the magnet 38M and the magnetic substance 48 are separated despite the magnetic force of the magnet 38M that configures the locking mechanism; consequently, the driven member 46 slides along the guide rail 32G and the upper rotational lever 40U and the lower rotational lever 40D are rotated about the rotational shaft 42, as illustrated. In this operation, the front-side edge 22RF of the door 22R is guided by the guide rail 32G and moved in parallel with the portal 25, and the rear-side edge 22RR opposite to the front-side edge 22RF is moved in a direction separate from the portal 25 and side wall 23, or more specifically the downward direction in FIG. 5, as the upper rotational lever 40U and the lower rotational lever 40D are rotated.

Namely, the upper rotational lever 40U and the lower rotational lever 40D are rotated about the rotational shaft 42 and in turn the connecting shafts 41U and 41D, which are positioned at the end of the levers 40U and 40D, and are moved along an arcuate locus Tu, so that the door 22R is rotated about the connecting shafts 41U and 41D at the position sustained by the upper support member 38U and the lower support member 38D, and the rear-side edge 22RR is moved along a locus Tt. When the door 22R is moved toward the backside (toward the back wall 19), as described above, the driven member 46 runs over the engaging member 52P of the stopper 52, which composes the locking mechanism, and reaches the back end of the guide rail 32G so that the engaging member 52P once again projects out and the door 22R is locked in the open state.

Accordingly, the door 22R is rotated about 45 degrees about the front-side edge 22RF (or the driven member 46) and is moved toward the inside of the aseptic manipulation chamber 13 while sliding the front-side edge 22RF toward the back side (toward the back wall 19). Thereby, the door 22R uncovers the portal 25 as the door 22R, which is positioned in parallel with the side wall 23, is transferred by its rear-side edge 22RR moving away from the side wall 23, and in turn, the door 22R is inclined about 45 degrees from the side wall 23 and the surface of the door 22R, on which the handle 54 is provided, faces to the front.

On the other hand, when closing the door 22R from the above-mentioned open state, the operator draws the handle 54, which is faced forward, toward the front side so that the driven member 46 runs over the engaging member 52P of the stopper 52, and when the driven member 46 reaches the front end of the guide rail 32G, the door 22R is fitted in the frame member 32, which forms the portal 25, via the magnetic force from the magnet 38M. In this situation, the seal-activating switch 24R is operated to expand the looped tube 34 until the clearance between the door 22R and the frame member 22R is filled in and the opening is sealed off and converted to the closed state.

As described above, according to the present embodiment, the door can be opened by an operator pushing the handle toward the back side (toward the back wall 19). Further, in the open state, the handle of the door is positioned on the side facing the front of the aseptic manipulation chamber so that an operator can easily access the handle and can close the door just by pulling the handle. Therefore, the operability of the door open/close operation is improved.

Further, since the inventive door is moved along both of the side wall formed with the opening or portal and the back wall intersecting the side wall, it can reduce the dead space in the door passing area compared with an isolator adopting a hinge-type door, and the space inside the aseptic manipulation chamber can be used efficiently.

Moreover, since the handle is inclined so that the front side is positioned lower, and the handle is provided at a level accommodating the height of the gloves, when the door is being closed the handle of the door can easily be gripped by an operator's hand naturally extended forward.

Further, the door can easily be transferred to the open state by simply holding the handle, pushing the door toward the back side (toward the back wall 19) and rotating the door about the front-side edge. The door in the open state is also easily transferred to the closed state by just pulling the handle.

Note that in the present embodiment, the hermetic performance of the aseptic manipulation chamber is further secured by sealing the periphery of the door with the looped tube. In the present embodiment, the door will not be moved unintentionally even in the unsealed condition, in which the door is not secured by the expanded looped tube, because the position of the door is retained by the magnet at the closed position and by the stopper at the open position.

In the present embodiment, the door is opened and closed by manually operating the handle. However, the door may also be operated automatically by providing and actuating an actuator that rotates the rotational shaft 42 connected to the base-end side of the upper rotational lever 40U and the lower rotational lever 40D. In such case, a button for actuating the actuator, instead of the handle, may be provided on the surface of the door, as an operating portion such that the door can be opened or closed automatically by an operator manipulating the button through the gloves.

The location where the portal is formed on the aseptic manipulation chamber is not restricted to the side wall of the aseptic manipulation chamber and it may also be formed on any inner surface of the aseptic manipulation chamber, including the floor and ceiling, if the portal can be opened by moving the front-side edge of the door toward the back side (toward the back wall 19) and rotating the door about the front-side edge.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2016-130852 (filed on Jun. 30, 2016), which is expressly incorporated herein, by reference, in its entirety.

The invention claimed is:

1. An isolator comprising:
    a manipulation chamber isolated from the external atmosphere;
    a front side of the manipulation chamber being provided with gloves for an operator to work inside of the manipulation chamber from outside of the manipulation chamber;
    a portal formed on the manipulation chamber, and a door for opening and closing the portal;
    the portal being formed on a side wall with respect to the front side;
    a linear guide mechanism for guiding a linear motion of a front-side edge of the door along the portal; and
    a rotation guide mechanism defining a rotation of the door about an axis coinciding with the front-side edge;
    the door is closed by positioning the front-side edge at the front side of the manipulation chamber, and the door is opened inward into the manipulation chamber by moving the front-side edge toward the back side of the manipulation chamber, which faces the front side of the manipulation chamber, while rotating the door about the front-side edge; and
    an operating element is provided at an angle on the inner central surface of the door, whereby the door is opened by pushing the operating element toward the back side of the manipulation chamber using a glove, wherein the operating element is provided at a same height or a lower height than the glove.

2. The isolator according to claim 1, wherein the operating element faces the front side of the manipulation chamber in an open state.

3. The isolator according to claim 1, wherein the rotation guide mechanism comprises a lever member in which a base end is rotatably supported by an inner surface of the manipulation chamber and a tip end is rotatably connected to the door.

4. The isolator according to claim 1, wherein the door is fitted into the portal in the closed state and comprises a seal element for sealing a clearance between the portal and the door fitted into the portal.

5. The isolator according to claim 1, comprising locking mechanisms for retaining the door in a closed position and opened position.

* * * * *